United States Patent
Ueda et al.

(10) Patent No.: US 7,957,034 B2
(45) Date of Patent: Jun. 7, 2011

(54) IMAGE PROCESSING APPARATUS AND INFORMATION PROCESSING APPARATUS

(75) Inventors: Nobuyuki Ueda, Nara (JP); Shuhji Fujii, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 782 days.

(21) Appl. No.: 11/985,682

(22) Filed: Nov. 16, 2007

(65) Prior Publication Data

US 2008/0117469 A1 May 22, 2008

(30) Foreign Application Priority Data

Nov. 20, 2006 (JP) ................................. 2006-313387

(51) Int. Cl.
*H04N 1/40* (2006.01)
(52) U.S. Cl. ....... 358/3.28; 358/540; 358/448; 358/450; 382/284
(58) Field of Classification Search ......................... None
See application file for complete search history.

(56) References Cited

U.S. PATENT DOCUMENTS

| | | | |
|---|---|---|---|
| 7,239,418 B2 * | 7/2007 | Mori | 358/1.18 |
| 7,444,036 B2 * | 10/2008 | Matsunoshita et al. | 382/284 |
| 7,639,836 B2 * | 12/2009 | Ito | 382/100 |
| 7,643,651 B2 * | 1/2010 | Asai | 382/100 |
| 7,660,020 B2 * | 2/2010 | Ishii | 358/3.28 |
| 7,684,089 B2 * | 3/2010 | Yamada | 358/3.28 |
| 7,692,819 B2 * | 4/2010 | Yasukaga et al. | 358/3.28 |
| 2003/0179412 A1 * | 9/2003 | Matsunoshita | 358/3.28 |
| 2006/0126095 A1 * | 6/2006 | Tamura et al. | 358/1.14 |
| 2006/0210193 A1 * | 9/2006 | Ishii | 382/284 |
| 2007/0076261 A1 * | 4/2007 | Ito | 358/3.28 |
| 2007/0086060 A1 * | 4/2007 | Chiba et al. | 358/3.28 |
| 2008/0144115 A1 * | 6/2008 | Ishii | 358/3.28 |
| 2008/0144125 A1 * | 6/2008 | Okamoto et al. | 358/453 |

FOREIGN PATENT DOCUMENTS

| | | |
|---|---|---|
| CN | 1787590 A | 6/2006 |
| JP | 2000-175027 | 6/2000 |
| JP | 2000-246997 | 9/2000 |
| JP | 2005-191994 | 7/2005 |
| JP | 2005-277548 | 10/2005 |
| JP | 2005277548 A * | 10/2005 |

* cited by examiner

*Primary Examiner* — King Y Poon
*Assistant Examiner* — Dung D Tran
(74) *Attorney, Agent, or Firm* — Edwards Angell Palmer & Dodge LLP; David G. Conlin; David A. Tucker (57) ABSTRACT

The present invention provides an image processing apparatus capable of preventing a specific image from being added without imposing a burden on the user, at the time of printing image data to which the specific image need not be added. The image processing apparatus includes a processing section configured to process the image data according to processing information, a specific image adding section 63 configured to add the specific image to the image data, and an addition determination section 65 configured to determine whether or not the specific image needs to be added, on the basis of the processing information. When the processing information includes unique information for preventing the image data from being kept confidential, the addition determination section 65 determines that the specific image need not be added. Even when it is set that the specific image is added at the time of processing the image data, the operation of the specific image adding section 63 is restricted so that the specific image is not added.

7 Claims, 6 Drawing Sheets

IMAGE PROCESSING APPARATUS AND INFORMATION PROCESSING APPARATUS

BACKGROUND OF THE INVENTION

1. Field of the Invention

The present invention relates to an image processing apparatus adapted to add a specific image for restricting processing such as copying, facsimile communication and data transmission, to input image data.

2. Description of the Related Art

In the image processing apparatus, there is performed processing such as receiving image data, and outputting the image data by copying, facsimile communication and data communication. When a specific image is detected from the input image data, the processing to be performed is restricted. This makes it possible to prevent unauthorized use of the image processing apparatus and to protect the image data.

The specific image is added when the image data are output. For example, when the image processing apparatus is instructed to print image data from an information processing apparatus such as a personal computer, the image processing apparatus synthesizes the image data received from the information processing apparatus with the specific image, and prints out the synthesized image data.

A printer driver is installed in the information processing apparatus. The print instruction of image data is provided by the printer driver. The addition of the specific image is determined by the setting of the printer driver. When the driver is set so that the specific image is added, the setting is stored as a standard setting. In the subsequent processes, each time the information processing apparatus issues the instruction to print the image data, the image processing apparatus prints the image data by adding the specific image to the image data. A document added with the specific image is created.

In the case of copying the document added with the specific image representing regulation information of copy prohibition, the image processing apparatus reads the image data from the document, and prohibits the document from being copied at the time of detecting the specific image from the image data.

Meanwhile, if the specific image is automatically added at the time when the image data are printed, the document created in this manner cannot be copied. For example, when creating materials for distribution, the document cannot be copied, resulting in a problem that the user cannot create materials. The user who knows the setting about the specific image is able to cope with the problem by changing the setting of the printer driver. However, the user who does not know the setting is unable to change the setting and tries to create the document which is prohibited from being copied. Therefore, the user uses the image processing apparatus without changing the setting, and is troubled in a subsequent work process. This impairs the user's convenience.

Here, Japanese Patent Laid-Open No. 2000-175027 describes that pictures and characters in image data are discriminated, and when there are many characters, a specific image is added. Japanese Patent Laid-Open No. 2005-191994 describes that when printing is performed to a printed recording sheet, a specific image is not added. In this way, in the image processing apparatus, the specific image is selectively added so as to improve the user's convenience.

The specific image is to be added to image data including confidential information. However, it is not necessary to add the specific image to image data in which confidential information is not obviously included. In the case where the specific image is not added, if the printer driver of the information processing apparatus is set so as to add the specific image, it is necessary for the user to temporarily cancel the setting. This increases the burden of the user.

In this respect, according to the above described references, when a unique condition is satisfied, the specific image is not added so as to reduce the user's burden. However, in order to discriminate pictures and characters, it is necessary to preliminarily scan the document and to determine the ratio between the pictures and the characters. Also, before the printing, it is necessary to detect whether or not the recording sheet has already been printed. In this way, the above described methods are not efficient because a new process is added prior to the process for printing the image data.

In view of the above, it is an object of the present invention to provide an image processing apparatus and an information processing apparatus which, when performing processing of image data to which the specific image need not be added, are capable of efficiently performing the processing and preventing the specific image from being added.

SUMMARY OF THE INVENTION

The image processing apparatus according to the present invention includes a processing section configured to process image data according to processing information, a specific image adding section configured to add a specific image to the image data, and an addition determination section configured to determine whether or not the specific image needs to be added, on the basis of the processing information.

The specific image adding section is operated according to whether or not the specific image needs to be added. When it is determined that the specific image need not be added, the operation of the specific image adding section is restricted so as to prevent the specific image from being added. When it is determined that the specific image needs to be added, the specific image adding section is permitted to operate so as to add the specific image.

The image processing apparatus includes an input section for receiving image data. When it is set so that the specific image is added at the time of processing the input image data, the addition determination section determines whether or not the specific image needs to be added. When the addition determination section determines that the specific image need not be added, the operation of the specific image adding section is restricted. Even when it is set so that the specific image is added, the operation of the specific image adding section is automatically restricted in the case of image data to which the specific image needs not be added. The image data are processed without being added with the specific image.

When the processing information includes unique information which prevents the image data from being kept confidential, the addition determination section determines that the specific image need not be added. When the processing information includes the unique information, it is determined that the image data are image data which need not be kept confidential. Here, when image data are processed, the processing information is necessarily referred to. By determining whether or not the specific image needs to be added, with the use of the processing information, it is possible to eliminate the need for the user to perform an operation such as an operation for changing the setting.

The processing information includes a file name of image data, and the addition determination section determines whether or not the file name corresponds to the unique information. When the file name includes characters, such as catalog and pamphlet, which prevent the image data from being kept confidential, the specific image need not be added. When the file name includes such characters, the addition determination section determines that the file name corresponds to the unique information.

The processing information includes information relating to a recording sheet on which the image data are printed, and the addition determination section determines whether or not the recording sheet to be printed corresponds to the unique information. The recording sheet includes those such as a punch paper and a label paper, which are not suitable for creating a confidential document. When such a recording sheet is specified for printing, it is determined that the image data need not be kept confidential. When the specified recording sheet is included in the processing information, the addition determination section determines that the specified recording sheet corresponds to the unique information.

The processing information includes font information of the image data, and the addition determination section determines whether or not the font information corresponds to the unique information. The font information includes fonts and font sizes which are not used for the confidential document. The image data in which such special fonts and special font sizes are used, are created without the purpose of making the image data kept confidential. When such special fonts and special font sizes are used, the addition determination section determines that the special fonts and special font sizes correspond to the unique information.

Meanwhile, the information processing apparatus outputs image data to the image processing apparatus which performs processing of the image data according to the processing information. The information processing apparatus includes a processing information generation section configured to generate processing information corresponding to image data, an output section configured to output the processing information together with the image data, an addition instruction section configured to instruct that the specific image is added to the image data, and an addition determination section configured to determine whether or not a specific image needs to be added, on the basis of the processing information.

In the information processing apparatus, the addition instruction section is operated according to whether or not the specific image needs to be added. When it is determined that the specific image need not be added, the addition instruction section is not operated. That is, the addition instruction section does not instruct the image processing apparatus to add the specific image. The image processing apparatus does not add the specific image. When it is determined that the specific image needs to be added, the addition instruction section is operated to instruct that the specific image is added. On the basis of this instruction, the image processing apparatus is operated so that the specific image is added by the specific image adding section.

When it is set so that the instruction to add the specific image is issued at the time of outputting the image data, the addition determination section determines whether or not the specific image needs to be added. When it is determined that the specific image need not be added, the operation of the addition instruction section is restricted. Thereby, when the specific image need not be added, it is possible to prevent the instruction for adding the specific image from being issued, without changing the setting.

When the processing information includes the unique information for preventing the image data from being kept confidential, the addition determination section determines that the specific image need not be added, and the operation of the addition instruction section is restricted. The unique information here is the same as those described above. When the processing information is generated by the processing information generation section, the addition determination section is made to be able to determine whether or not the specific image needs to be added.

According to the present invention, when image data to which the specific image need not be added are processed, whether or not the specific image needs to be added is determined on the basis of the processing information. Thus, it is not necessary for the user to perform a special operation, and the user's burden is reduced. Further, the processing information is also processed in association with ordinary processing in the image processing apparatus. Thus, there is no need to add a new process in order to determine whether or not the specific image needs to be added. As a result, the processing can be efficiently performed. In particular, when the specific image is normally set to be added, it is possible to prevent the specific image from being added without changing the setting. As a result, it is possible to improve the user's convenience and the processing efficiency of the apparatus.

DETAILED DESCRIPTION OF THE PREFERRED EMBODIMENTS

Figure 1:
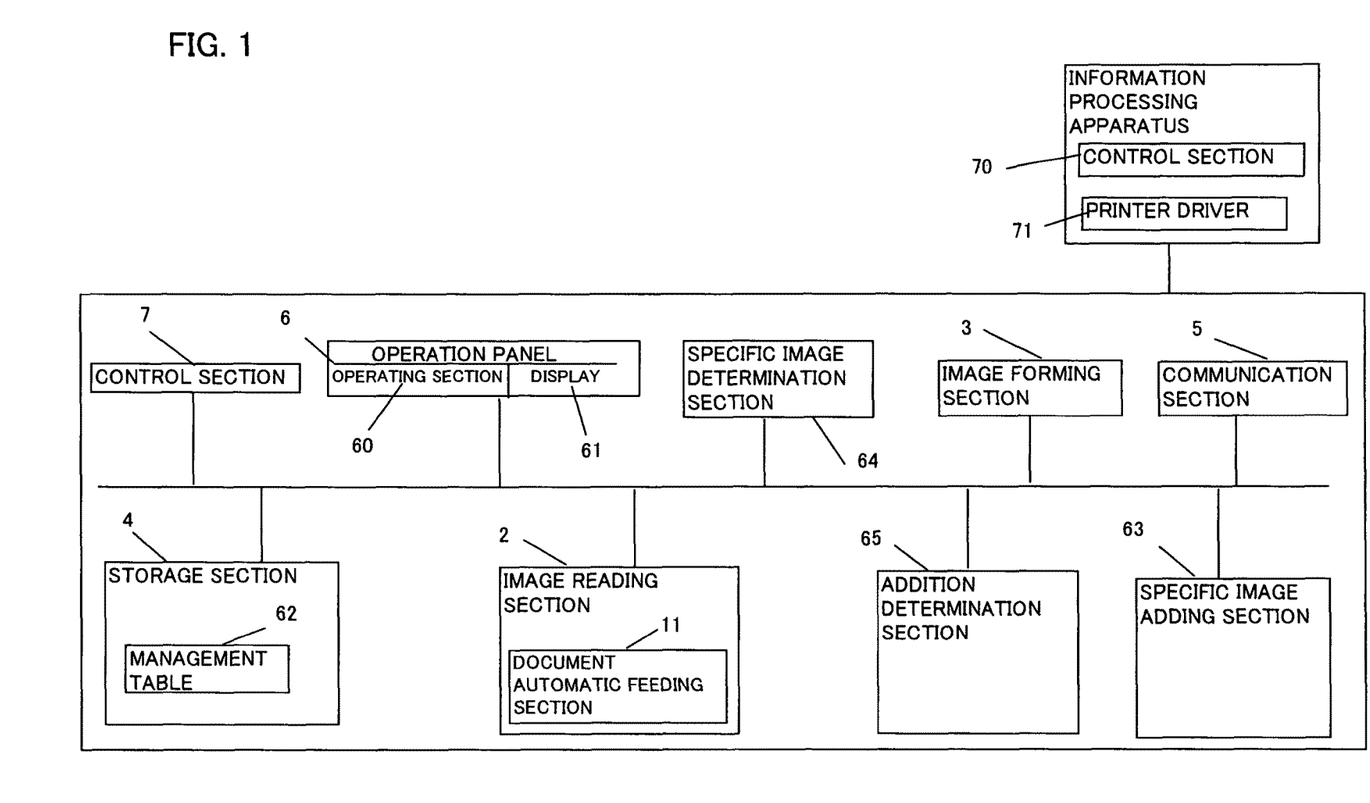
FIG. 1 is a schematic control block diagram of an image processing apparatus and an information processing apparatus according to the present invention.

FIG. 1 shows an image processing apparatus according to the present embodiment. The image processing apparatus is a composite machine which performs a copy mode, a print mode, a scanner mode and a facsimile mode, and which includes in a cabinet 1 an image reading section 2 adapted to read a document and receive image data of the document, an image forming section 3 adapted to process and print the image data, a storage section 4 adapted to store the image data, a communication section adapted to perform communication with an external apparatus, an operation panel 6 for input operation, and a control section 7 adapted to control a processing section to perform processing of the image data according to the mode. Note that the processing section is a section which performs processing for outputting the input image data, and is configured by the image forming section 3, the storage section 4, and the communication section 5.

Figure 2:
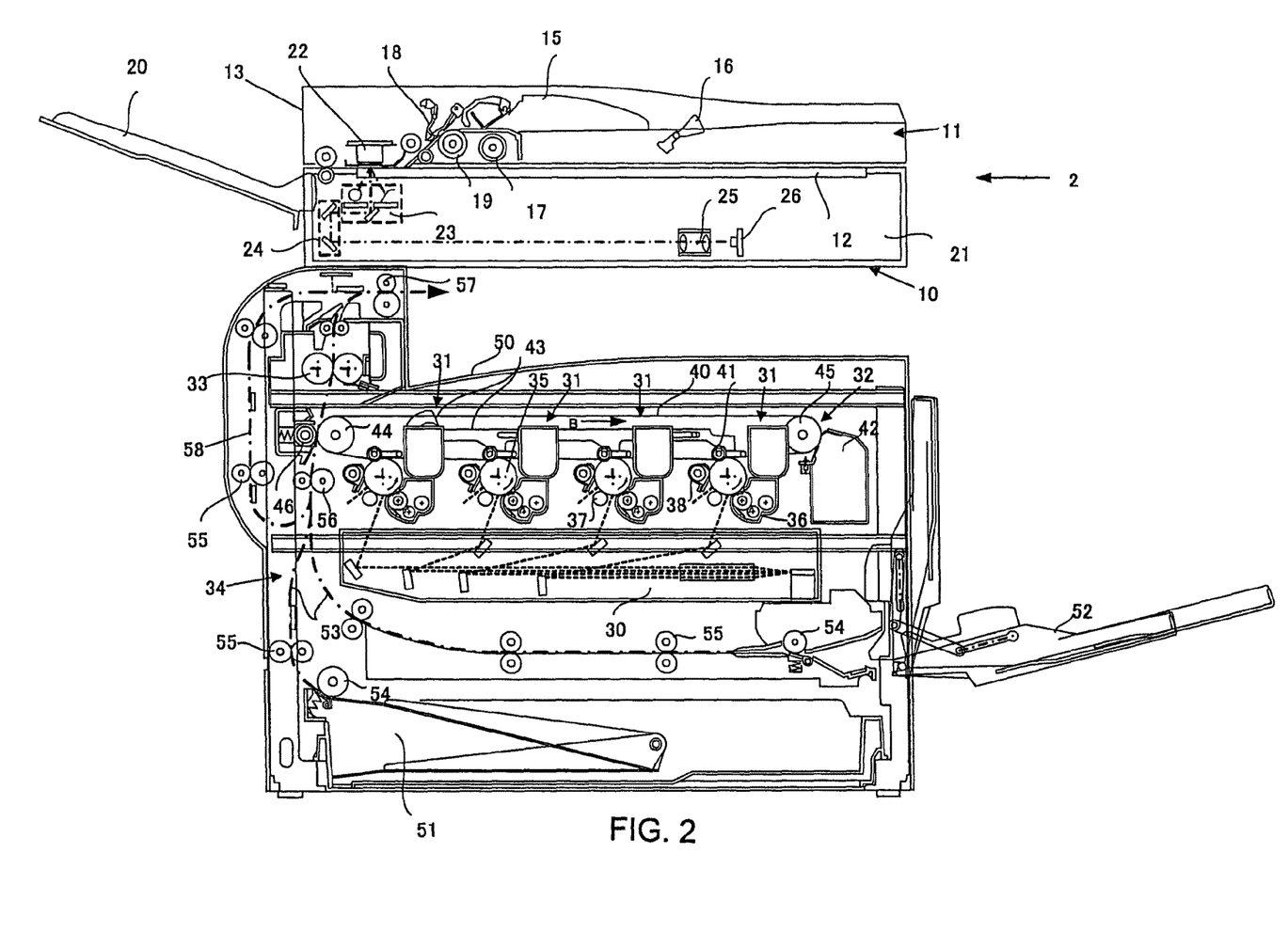
FIG. 2 is a figure schematically showing an entire constitution of the image processing apparatus.

As shown in FIG. 2, the image reading section 2 is arranged in the upper part of the cabinet 1, and includes a scanner section 10 and a document automatic feeding section 11. The document automatic feeding section 11 is provided above the scanner section 10, and automatically feeds a document in order to read image data of the document.

A document table 12 made of platen glass is provided on the upper surface of the cabinet 1, and a document cover 13 covering the document table 12 is provided. The document automatic feeding section 11 is integrally mounted to the document cover 13. The document cover 13 is provided in an openable and closable manner. The document is fed by the document automatic feeding section 11 when the document cover 13 is closed. When the document cover 13 is opened, the document can be placed on the document table 12. The opening and closing of the document cover 13 are detected by a cover opening and closing sensor. Further, a document size detection sensor for detecting the size of the document placed on the document table 12 is provided.

When a document is set on a document set tray 15 of the document automatic feeding section 11, the document detection sensor 16 detects that the document is set. Then, in the operation panel 6, copying conditions such as the size of a sheet to be printed and a variable magnification factor are input. Thereafter, the reading of the image of the document is started by an input operation of a start key.

In the document automatic feeding section 11, the document on the document set tray 15 are pulled out one by one by a pickup roller 17. The document is delivered to the document table 12 through between a sorting plate 18 and a feeding roller 19. The document is fed in the subscanning direction on the document table 12, and is discharged to a document discharge tray 20. A document discharge sensor is provided for the document discharge tray 20, and the presence of the document on the document discharge tray 20 is detected.

The scanner section 10 includes a first reading section 21 and a second reading section 22. A reading area is formed in one side of the document table 12. When the document is fed on the document table 12, the document passes through the reading area. Below the reading area, a first scanning unit 23 of the first reading section 21 is located to read the surface (lower surface) of the document.

When the document is fed to the document table 12 by the document automatic feeding section 11, the first scanning unit 23 is moved and positioned at a reading position, and a second scanning unit 24 is also positioned at a predetermined position. By an exposure lamp of the first scanning unit 23, the surface of the document is irradiated from below the document table 12. The reflected light from the document is led to an image forming lens 25 by respective reflection mirrors of the first and second scanning units 23 and 24. The reflected light of the document is condensed at a CCD 26 by the image forming lens 25. The image on the surface of the document is formed on the CCD 26. Thereby, the image on the surface of the document being fed is read.

The rear surface (upside surface) of the document is read by the second reading section 22. The second reading section 22 is arranged above the document table 12, and includes an LED for irradiating the rear surface of the document, an exposure lamp array having a fluorescent lamp and the like, a SELFOC lens array for condensing the reflected light from the document onto each pixel, a contact image sensor (CIS) for photoelectrically converting the reflected light received from the document through the SELFOC lens array, and for outputting an analog image signal, and the like. Thereby, the image on the rear surface of the document being fed is read.

When the document is placed on the document table 12, the image on the surface of the document is read by the first reading section 21. The first and second scanning units 23 and 24 are moved in the subscanning direction, while a predetermined speed relation is maintained between the first and second scanning units. The document on the document table 12 is exposed by the first scanning unit 23, and the reflected light from the document is led to the image forming lens 25 by the first and second scanning units 23 and 24. The image of the document is formed on the CCD 26 by the image forming lens 25.

In this way, when the image on the one surface or both surfaces of the document is read, image data of the one surface or both surfaces of the document are input into the control section 7. The control section 7 has an image data processing section, by which various kinds of image processing are performed to the image data. The processed image data are output to the image forming section 3.

The image forming section 3 prints a color image or a monochromatic image on a recording sheet on the basis of the input image data. The image forming section 3 includes a laser scanning unit 30, four image stations 31, an intermediate transfer belt unit 32, a fixing apparatus 33, and a feeding apparatus 34.

The image stations 31 form color images corresponding to each color of black, cyan, magenta, and yellow, respectively. Each of the image stations 31 includes a photoreceptor drum 35, a developing apparatus 36, a charging apparatus 37, a cleaning apparatus 38, and a discharging apparatus (not shown).

The photoreceptor drum 35 is rotatably driven in one direction. The cleaning apparatus 38 cleans a residual toner on the surface of the photoreceptor drum 35. The discharging apparatus removes charges on the surface of the photoreceptor drum 35. The charging apparatus 37 makes the surface of the photoreceptor drum 35 uniformly charged.

The laser scanning unit 30 modulates a laser beam on the basis of the image data input from the image reading section or the like, and forms an electrostatic latent image on the surface of the photoreceptor drum 35 by repeatedly scanning the surface of the photoreceptor drum 35 in the main scanning direction with the modulated laser beam. The developing apparatus 36 develops the electrostatic latent image by supplying a toner onto the surface of the photoreceptor drum 35, so as to form a toner image on the surface of the photoreceptor drum 35.

The intermediate transfer belt unit 32 includes an intermediate transfer belt 40, an intermediate transfer roller 41, a transfer belt cleaning apparatus 42, and a tension mechanism 43. The intermediate transfer belt 40 is arranged above each of the photoreceptor drums 35, and is hung on and wound around a driving roller 44 and a driven roller 45, so as to be rotated in the direction of arrow B.

The intermediate transfer roller 41 is arranged opposite the photoreceptor drum 35 so as to make the intermediate transfer belt 40 sandwiched between the intermediate transfer roller 41 and the photoreceptor drum 35. A transfer bias voltage is applied to the intermediate transfer roller 41. Due to the application of the transfer bias voltage having a polarity opposite to that of the toner by the intermediate transfer roller 41, the toner image on the surface of the photoreceptor drum 35 is transferred onto the intermediate transfer belt 40. The toner images of the respective colors are laminated on the intermediate transfer belt 40, so that a synthesized multicolor toner image is formed.

The transfer roller 46 is arranged by being press contacted to the intermediate transfer belt 40. A voltage having a polarity opposite to that of the toner is applied to the transfer roller 41. The toner image on the intermediate transfer belt 40 is transferred by the transfer roller 46 onto a recording sheet which is fed between the transfer roller 46 and the intermediate transfer belt 40. The toner remaining on the intermediate transfer belt 40 is removed by the transfer belt cleaning apparatus 42.

The toner image transferred onto the recording sheet is heated and pressed by the fixing apparatus 33 to be fixed on the recording sheet, so that an image is formed on the recording sheet. The recording sheet on which the image is printed in this way is discharged to a discharge tray 50 provided in the upper part of the cabinet 1.

The feeding apparatus 34 feeds the recording sheet from a sheet cassette 51 or a manual tray 52 along a paper path 53. The paper path 53 passes between the intermediate transfer belt 40 and the transfer roller 46, and through the fixing apparatus 33, to reach the discharge tray 50.

The feeding apparatus 34 includes a pickup roller 54, a feeding roller 55, a resist roller 56, and a discharge roller 57. Recording sheets in the sheet cassette 51 or the manual tray 52 is delivered one by one to the paper path 53, and is fed along the paper path 53 so as to be discharged to the discharge tray 50. The image is printed on the recording sheet during the feeding of the recording sheet. A switchback paper path 58 is provided for the double-surface printing. The recording sheet after the fixation is fed by the feeding roller 55 through the switchback paper path 58 and is fed between the intermediate transfer belt 40 and the transfer roller 46. The recording sheet subjected to the double-surface printing is fed through the fixing apparatus 33, and is discharged to the discharge tray 50.

The operation panel 6 is provided in the scanner section 10, and includes an operating section 60 and a display 61. The operating section 60 includes various operation keys. The display 61 consists of a liquid crystal display which is formed as a touch panel. Touch keys are formed in the operation screen displayed in the display 61, and also function as operation keys.

The communication section 5 includes a communication interface which is connected to a network such as LAN and WAN. A plurality of external apparatuses are connected to the network. The external apparatuses include other image processing apparatuses, and information processing apparatuses such as a personal computer and a server. The network is connected from a router to the internet via a communication line, such as a telephone line and an optical fiber. The communication section 5 is enabled to perform communication based on a predetermined communication protocol with the external apparatuses through the network. Further, the image processing apparatuses are also enabled to perform communication with each other. Note that the communication within the network may be performed by wire or radio. An image processing system is formed by the image processing apparatuses and the external apparatuses.

Further, the communication section 5 includes a modem apparatus. A telephone line is connected to the modem apparatus. The image processing apparatus is capable of performing facsimile communication. Note that the image processing apparatus is also capable of performing data communication by an internet facsimile through the network. Further, the communication section 5 includes a communication terminal and a communication card for radio communication. Storage media, such as an USB memory and an IC card, are connected to the communication terminal, so that the communication section 5 performs transmission and reception of data to and from the storage media. Further, the communication section 5 performs transmission and reception of data to and from communication terminals, such as a portable telephone and a print driver, through the communication card on the basis of radio communication.

The storage section 4 consists of a hard disk drive. The storage section 4 stores image data input from the image reading section 2, or image data input from the communication section 5. Note that the input image data are once stored in an image memory such as a DRAM, and subjected to image processing and encryption processing. Thereafter, the processed image data are transferred from the image memory to the storage section 4. Further, when the image data are read from the storage section 4, the image data are subjected to image processing and decryption processing, so as to be stored in the image memory. Thereafter, the image data are externally output by printing, data transmission, and facsimile communication according to the processing to be performed.

The storage section 4 includes a management table 62 configured to store information which is necessary for operating the image processing apparatus, and which includes control information and setting information of the image processing apparatus, user's authentication information, or the like. When these kinds of information are created and changed, the information in the management table 62 is updated. Note that the management table 62 may be provided in a nonvolatile memory separate from the storage section 4.

The control section 7 consists of a microcomputer having a CPU, a ROM and a RAM. The CPU reads a control program stored in the ROM to the RAM, and executes the control program. Each section is operated according to the control program.

That is, when image data are input from the image reading section 2 or the communication section 5, which are functioning as an input section, one of the print mode, the copy mode, the scanner mode, and the facsimile mode is performed on the basis of processing conditions which are included in the input information from the operating section 60 and in the header information of the image data input from the external apparatus. Further, the control program includes a browser and an e-mail software. The control section 7 performs data communication and transmission/reception of an e-mail to/from an external apparatus on the basis of a communication protocol such as a TCP/IP protocol.

When performing each mode, the control section 7 temporarily stores the input image data in the storage section 4. Further, the control section 7 performs a filing mode in which the input image data is stored in the storage section 4 and managed. The stored image data are again output according to instructed processing.

The output image data are erased from the storage section 4 according to the instruction from the control section 7. In erasing the image data, the image data are invalidated by overwriting random data on the image data, so as not to be restored. In this way, unauthorized use of the image data is prevented by performing the invalidation processing and the encryption processing.

In the information processing apparatus, a control section 70 executes an application software to create image data. Alternatively, the control section 70 reads image data by performing data communication with an external apparatus, and stores the read image data in the hard disk drive. When printing such image data, the control section 70 instructs the image processing apparatus to perform printing by using a printer driver 71.

The printer driver 71 receives the image data from the control section 70, and converts the image data into PDL (Page Description Language) data. Further, the printer driver 71 creates, as processing information, printing conditions set for the printing of the image data. Then, the printer driver 71 outputs print data consisting of the PDL data and the processing information to the control section 70. The control section 70 transmits the print data to the image processing apparatus. In this way, the print driver 71 has a processing information generation section configured to generate the processing information for the image data, and an output section configured to output the processing information together with the image data.

In the image processing apparatus, upon receipt of the print data, the image data processing section of the control section 7 analyzes the print data, and performs image processing of the PDL data on the basis of the processing information, so as to generate image data. The image data processing section outputs the image data to the image forming section 3. The image forming section 3 prints an image on a recording sheet on the basis of the input image data.

Here, in order to prevent unauthorized copying and unauthorized facsimile transmission of a confidential document, a specific image is added to a document. The specific image represents regulation information for controlling the execution of processing about the document, such as copy prohibition, lowering of printed image quality, prohibition of data transmission and facsimile communication, and prohibition of filing.

A specific image adding section 63 which is a section for adding the specific image is provided. The specific image adding section 63 is controlled by the control section 7 so as to generate a specific image on the basis of determined additional conditions, and to synthesize the image data with the specific image. The control section 7 performs processing, such as printing of the synthesized image data, data transmission, and filing.

The additional conditions for the specific image are stored beforehand in the management table 62. The additional conditions include a form of the specific image, an image forming condition, a number, a position, and the like. The specific image adding section 63 reads the additional conditions, and generates a specific image on the basis of the additional conditions to synthesize the input image data with the specific image.

Figure 3:
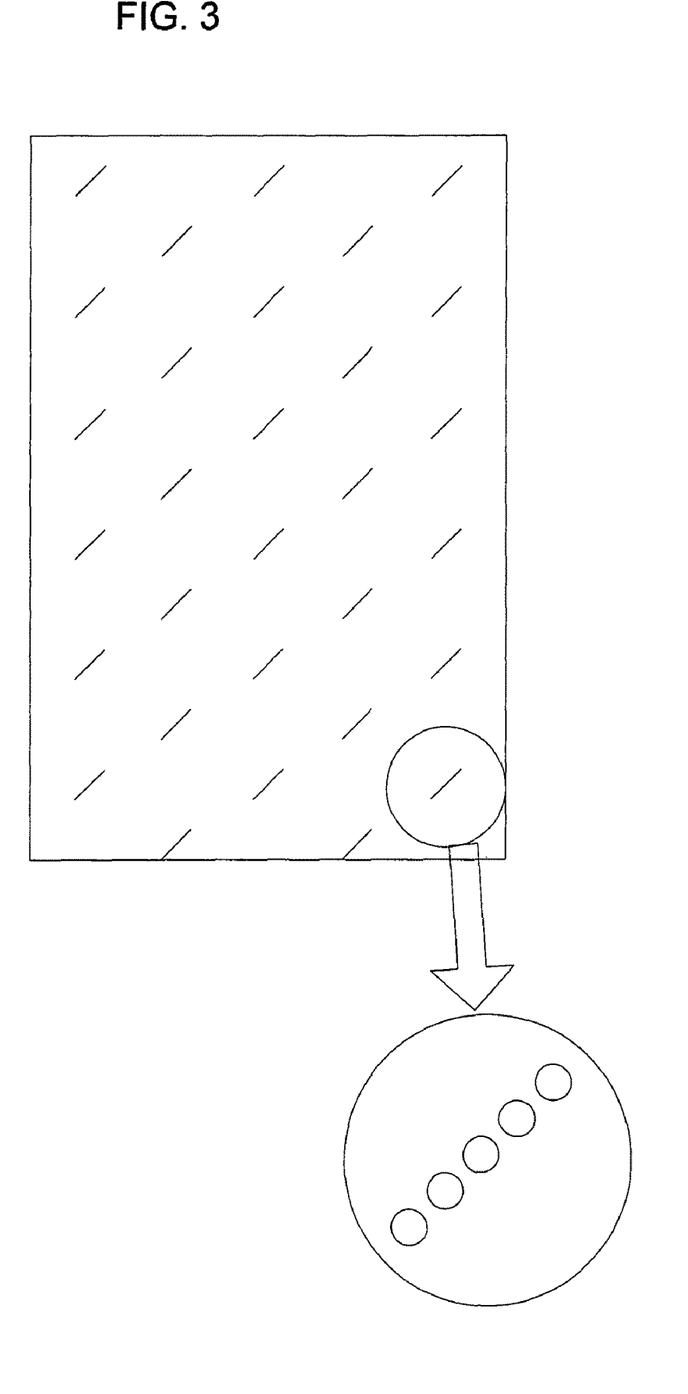
FIG. 3 is a figure showing a document on which specific images are arranged, and showing the enlarged specific image.

When the image data added with the specific image are printed, a document including the specific image as shown in FIG. 3 is created. The specific image is created in a form of an inclined pattern in which predetermined images, for example, a plurality of dots, are linearly arranged. The specific images of the same form are arranged regularly in predetermined positions. The plurality of specific images are included in one page of the document. Note that the number of the specific images per one page is determined according to the page size. The density of the specific image and the angle of the inclined pattern are also determined. In this case, the angle is set to 45 degrees.

Further, the image data including the specific image are data transmitted through the communication section 5. In the image processing apparatus which has received the image data, when the image data are printed, a document including the specific image is created.

In the copy mode for copying the document, in the image processing apparatus, it is possible to select whether or not the specific image is added. That is, when the user selects through the operating section that the specific image is added, the control section 7 operates the specific image adding section 63, in order to add the specific image.

In the print mode for printing the image data from the information processing apparatus, in the print driver 71, it is set whether or not the specific image is added. When it is set that the specific image is added, the print driver 71 generates processing information so that the specific image is added. In the image processing apparatus, according to the input processing information, it is instructed that the specific image is added. That is, the print driver 71 has an addition instruction section for instructing so that the specific image is added. Note that when the setting is performed so that the specific image is added, the print driver 71 instructs that the specific image is added, as long as the setting is not changed.

The specific image printed on the document is hard to be visually recognized by a person. However, the specific image can be read by the image reading section 2. Thus, as a detection section for detecting the specific image in the input image data, there is provided a specific image determination section 64 which detects whether or not the specific image is included in the image data, and determines whether or not the number of the specific images exceeds a threshold value. The image data are not limited to the data input from the image reading section 2, but are input through the communication section 5 from an external apparatus, a storage medium, or a communication terminal.

The specific image determination section 64 whose operation is controlled by the control section 7, detects the specific image by performing pattern matching between the input image data and image data corresponding to the specific image. The image data corresponding to the specific image are registered beforehand and stored in the management table 62. Then, the specific image determination section 64 counts the number of the detected specific images, and determines whether or not the number of the detected specific images exceeds the threshold value. When the image data are prepared in the unit of pages, the number of the specific images is calculated for each page. Alternatively, the number of the specific images in a predetermined area is calculated.

The threshold value is set by a user having the authority like a manager, and is stored in the management table 62. The user having the authority is authenticated by inputting authentication information such as a password and biomedical information such as a fingerprint. The authenticated user is able to set the threshold value through the operating section 60.

The control section 7 restricts the processing to be performed, when the specific images are included in the input image data in such a manner that the number of specific images exceeds the threshold value. That is, when the control section 7 detects that the specific image is included in the image data, the control section 7 functions to restrict the processing to the image data. At the time of the copy mode, the control section 7 issues the instruction for prohibiting the copying of the image data. At the time of the facsimile mode and the scanner mode, the control section 7 issues the instruction for prohibiting the transmission of the image data. Further, at the time of the filing mode, the control section 7 issues the instruction for prohibiting the storing of the image data in the storage section 4. Note that even if the control section 7 detects the specific images, when the number of specific images does not exceed the threshold value, the control section 7 does not restrict the processing.

In this way, by performing the addition and detection of the specific image, the image processing apparatus prevents unauthorized use of the image processing apparatus and performs security measures for protecting the image data. However, the image data also include data which need not be kept confidential, such as for example image data created so as to be opened to the public. In the case of processing such image data, it is not necessary to add the specific image.

Thus, the image processing apparatus includes an addition determination section 65 as a section for determining whether or not the specific image needs to be added. In the case of the print mode, the addition determination section 65 determines whether or not the specific image needs to be added, on the basis of input processing information. That is, whether or not the specific image needs to be added is determined according to whether or not unique information for preventing the image data from being kept confidential is included in the processing information. When the unique information is included in the processing information, the addition determination section 65 determines that the specific image need not be added. When the unique information is not included in the processing information, the addition determination section 65 determines that the specific image needs to be added. As the unique information, there are listed a file name of image data, a recording sheet for printing, and font information of the image data.

As for the file name of image data, the information processing apparatus deals with the image data as one file. A unique file name is attached to the file. The print driver 71 includes the file name in the processing information. When the file name includes characters, such as catalog, pamphlet, presentation and sample, the file name is regarded as the unique information because the file name is obviously attached in order to open the image data to the public. Further, it may also be adapted such that the user specifies arbitrary characters beforehand, and a file name including the characters is regarded as the file name serving as the unique information.

Figure 4:
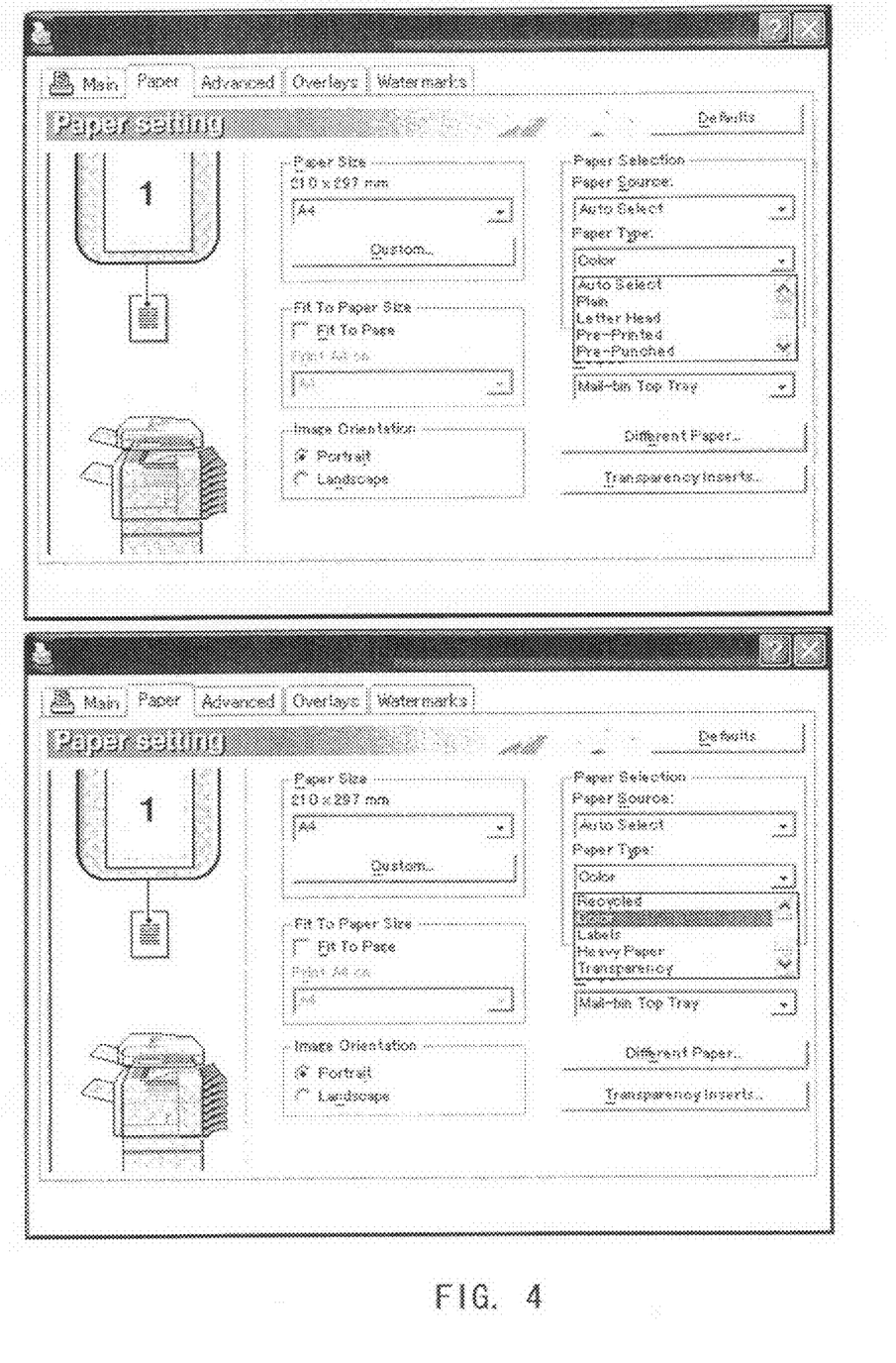
FIG. 4 is a figure showing a screen for setting a recording sheet by a print driver.

As for the recording sheet, the print driver 71 specifies a recording sheet to be printed. As shown in FIG. 4, a print setting screen is displayed in the display of the information processing apparatus. At this time, a list of recording sheets is displayed in Paper Type in the paper sheet setting screen. When the user selects a unique recording sheet from Paper Type, the print driver 71 includes the selected recording sheet in the processing information. The recording sheet includes a plain paper, a letterhead paper, a printed paper sheet, a punch paper, a recycled paper, a colored paper, a label paper, a paperboard, an OHP, a tab paper, and a Kent paper. Recording sheets unsuitable for printing a confidential image are regarded as the recording sheets serving as the unique information. Such recording sheets include, for example, the printed paper sheet, the punch paper, the recycled paper, the colored paper, the label paper, the OHP, and the tab paper.

As for the font information of image-data, in the information processing apparatus, when characters are included in the image data, the font, font size, and character decoration of the characters are set as the processing information. Also, the kind of font and the font size of the image data, which are used for printing, are defined in PDL data or PJL (Printer Job Language) data, so as to be included in the processing information. Here, when the font is a pop font style or a pictogram font such as Wingdings, the image data are not used for a confidential document such as a contract document. Such font is regarded as the unique information. Further, as for the font size, when the font size is larger or smaller than the size used for a common document, such font size is also regarded as the font size serving as the unique information. For example, such font size includes a font size not smaller than twenty four points or a font size not larger than eight points. Further, when a character decoration is set, the character decoration is regarded as the unique information.

The filename, the recording sheet, and the font information, which serve as the unique information as described above, are registered beforehand, and stored in the management table 62. The addition determination section 65 extracts a filename, a recording sheet, and font information from the input processing information, and determines whether or not they correspond to the unique information with reference to the management table 62. Then, the addition determination section 65 determines whether or not the specific image needs to be added.

Figure 5:
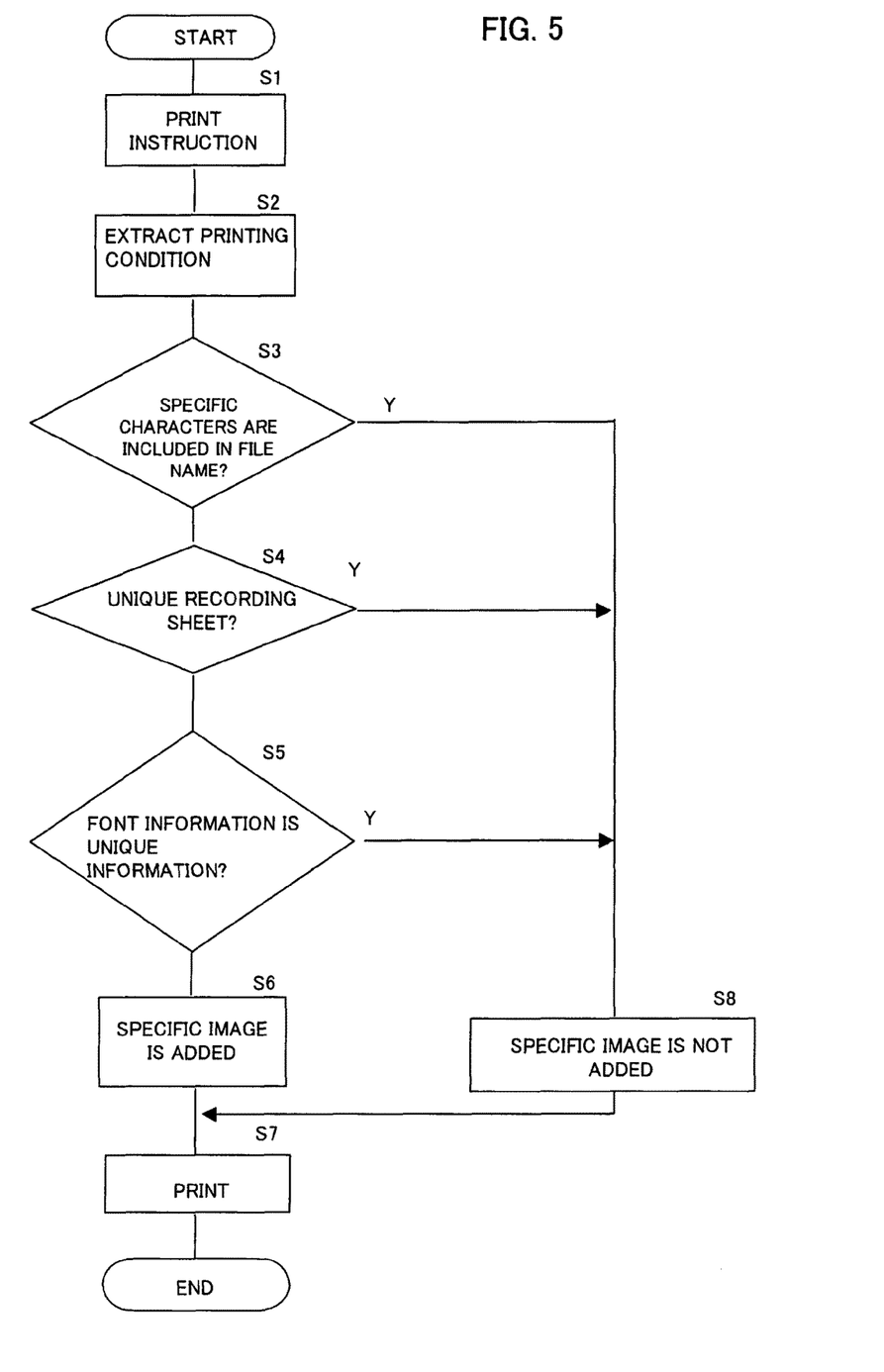
FIG. 5 is a flow chart showing a procedure at the time of determining whether or not a specific image needs to be added.

FIG. 5 shows a procedure when it is determined whether or not the specific image needs to be added. In the information processing apparatus, the print driver 71 generates print data, and the control section 70 transmits the print data to the image processing apparatus, to thereby instruct the printing of the print data (S1). In the image processing apparatus, upon receipt of the print data, the addition determination section 65 extracts printing conditions from the processing information included in the print data (S2).

The addition determination section 65 determines whether or not the filename of the image data to be printed corresponds to a filename registered as the unique information (S3). When the filename of the image data to be printed corresponds to the filename in the unique information, the addition determination section 65 determines that the specific image need not be added (S8). At this time, the image data are printed without being added with the specific image (S7).

When the filename of the image data to be printed does not correspond to any filename in the unique information, the addition determination section 65 determines whether or not the specified recording sheet corresponds to a recording sheet registered as the unique information (S4). When the specified recording sheet corresponds to the recording sheet registered as the unique information, the addition determination section 65 determines that the specific image need not be added (S8).

When the specified recording sheet does not correspond to any recording sheet registered as the unique information, the addition determination section 65 determines whether or not the font information corresponds to a font or a font size registered as the unique information (S5). When the font information corresponds to the font or the font size registered as the unique information, the addition determination section 65 determines that the specific image need not be added (S8).

When the font information does not correspond to any of the font or the font size registered as the unique information, the addition determination section 65 determines that the specific image needs to be added. The specific image adding section 63 adds the specific image to the image data. Then, the image data including the specific image are printed on the recording sheet (S7).

In this way, in the print driver 71, even in the case where the specific image is normally set to be added, when image data to which the specific image need not be added are printed, it is determined that the specific image need not be added, on the basis of the processing information for the image data. Therefore, it is only necessary for the user to instruct the ordinary printing to be performed, in order to obtain a document on which the image data are printed but the specific image is not added. Further, the analysis of the processing information is performed by the ordinary processing, and hence a new process is not added in order to determine whether or not the specific image needs to be added. As a result, the processing efficiency is not lowered, so that it is possible to perform the printing without delay. Since the specific image is not added, it is possible to save the toner to be used for printing the specific image, and to eliminate bad influence on a base image due to the specific image.

In the above description, whether or not the specific image needs to be added is determined in the print mode. In the case of the copy mode, the image processing apparatus reads the document and receives the image data of the document. The user sets copying conditions through the operating section 60. The control section 7 generates the copying conditions as the processing information. The addition determination section 65 determines whether or not the specific image needs to be added, on the basis of the processing information.

Figure 6:
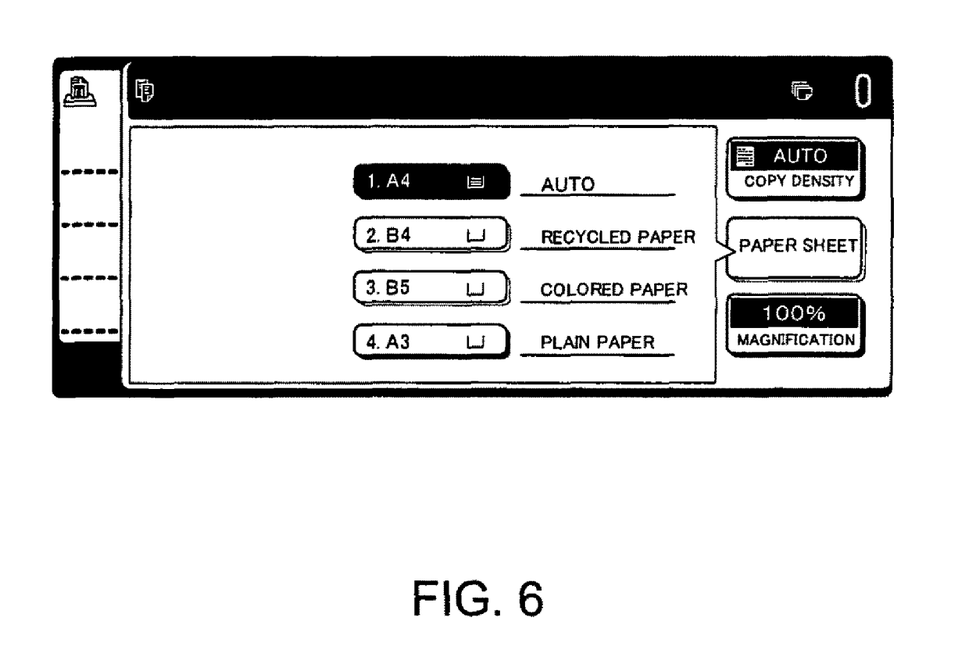
FIG. 6 is a figure showing a screen for selecting a recording sheet at the time of a copy mode.

In the case of the copy mode, the recording sheet specified for the printing is used as the unique information. As shown in FIG. 6, a paper sheet selection screen is displayed in the display 61 of the image processing apparatus. This screen displays a list of the sheet cassette 51 and the manual tray 52 in which the recording sheets to be printed are stored. The user selects the sheet cassette 51 or the manual tray 52. The recording sheet is associated with the sheet cassette 51 and the manual tray 52, and hence the recording sheet is specified by this selection.

The addition determination section 65 determines whether or not the specified recording sheet corresponds to a recording sheet registered as the unique information. When the specified recording sheet corresponds to the recording sheet registered as the unique information, the addition determination section 65 determines that the specific image need not be added. The specific image is not included in the printed image. When the specified recording sheet does not correspond to the recording sheet registered as the unique information, the addition determination section 65 determines that the specific image needs to be added. The image data including the specific image are printed.

As described above, in the image processing apparatus, when it is set so that the specific image is added, whether or not the specific image needs to be added is determined on the basis of the processing information at the time of performing the copy mode. When the specific image need not be added, the specific image is not added, and hence it is not necessary for the user to change the setting to add the specific image.

Note that in the image processing apparatus, when it is not set that the specific image is added, the specific image is added according to the result of determination on whether or not the specific image needs to be added. That is, when a unique recording sheet unsuitable for printing a confidential image is specified, it is determined that the specific image need not be added. On the contrary, when a confidential image may be printed, a recording sheet other than the unique recording sheet is specified. Then, the specific image is added and printed on the specified recording sheet. Therefore, except the case where the image to be printed is an image which is not obviously confidential, the specific image is added. Thus, when a confidential image is printed, the confidential image is printed by being necessarily added with the specific image.

As another embodiment, instead of determining in the image processing apparatus whether or not the specific image needs to be added, the information processing apparatus determines whether or not the specific image needs to be added. That is, the information processing apparatus has the addition determination section. This addition determination section has the same function as that in the above described image processing apparatus.

When the information processing apparatus issues an instruction for printing image data, the print driver 71 generates print data including the processing information. The control section 70 controls the addition determination section to determine whether or not the specific image needs to be added, on the basis of the processing information. The procedure for the determination is the same as the procedure in the image processing apparatus.

In the print driver 71, it is set beforehand so that the specific image is added. When it is determined that the specific image need not be added, the print driver 71 temporarily cancels the setting, and generates the processing information without adding the specific image. The print data including the processing information are transmitted to the image processing apparatus. In the image processing apparatus, since there is no instruction to add the specific image, the image data are printed without being added with the specific image.

In the case where it is normally set in the print driver 71 to add the specific image, the instruction to add the specific image is normally issued at the time of performing the printing in which the specific image need not be added, but as described above, this instruction is restricted. Therefore, it is not necessary for the user to change the setting, and hence the user's burden is reduced.

Note that the present invention is not limited to the above described embodiment, but numerous modifications and changes can be obviously made therein without departing from the spirit and scope of the present invention. In the image processing apparatus or the information processing apparatus, when users are authenticated and permitted to use the apparatus, unique information is determined for each of the users. Then, whether or not the specific image needs to be added may be determined in correspondence with each of the users. Since the criterion for determining whether or not the specific image needs to be added is different for each of the users, it is possible to correspond to each of the users by determining the unique information for each of the users, and to thereby improve the user's convenience.

The processing of image data not only includes the printing in the copy mode and the print mode, but also includes the processing in which image data added with the specific image are data transmitted to an external apparatus, and the filing processing. When such processing is performed, whether or not the specific image needs to be added may also be determined on the basis of a filename and font information.

In the image processing apparatus or the information processing apparatus, image data are stored in the hard disk drive. Therefore, the same image data can be processed as many times as necessary. When it is set that the specific image need not be added to such image data, it is not necessary to determine in each processing whether or not the specific image needs to be added. Thus, the unique information indicating that the specific image need not be added is set for such image data. At the time of processing of the image data, by checking the unique information, it is found that the specific image need not be added. Note that when the image data are changed and stored by overwriting, the image data are different from the original image data. In order to check that the image data are not changed, the hash value of the image data is used. Since the image data are not changed when the hash value is the same, the above described unique information is made valid.

What is claimed is:

1. An image processing apparatus comprising:
 a processing section configured to process image data according to processing information;
 a specific image adding section configured to add a specific image to the image data; and
 an addition determination section configured to determine whether or not the specific image needs to be added, on the basis of the processing information, wherein
 when a user sets that the specific image is added at the time of processing the input image data, the addition determination section determines whether or not the specific image needs to be added depending on whether or not the processing information includes unique information for preventing the image data from being kept confidential, and wherein when the processing information includes unique information for preventing the image data from being kept confidential, the addition determination section determines that the specific image need not be added, and the processing section processes the image data including no specific image.

2. The image processing apparatus according to claim 1, wherein the processing information includes a file name of the image data, and the addition determination section determines whether or not the filename corresponds to the unique information.

3. The image processing apparatus according to claim 1, wherein the processing information includes information relating to a recording sheet on which the image data are printed, and the addition determination section determines whether or not the recording sheet to be printed corresponds to the unique information.

4. The image processing apparatus according to claim 1, wherein the processing information includes font information of the image data, and the addition determination section determines whether or not the font information corresponds to the unique information.

5. An information processing apparatus configured to output image data to an image processing apparatus which performs processing of the image data according to processing information, the information processing apparatus comprising:
   a processing information generation section configured to generate the processing information corresponding to the image data;
   an output section configured to output the processing information together with the image data;
   an addition instruction section configured to instruct to add a specific image to the image data; and
   an addition determination section configured to determine whether or not the specific image needs to be added, on the basis of the processing information, wherein
      when a user sets that the specific image is added at the time of processing the input image data, the addition determination section determines whether or not the specific image needs to be added depending on whether or not the processing information includes unique information for preventing the image data from being kept confidential, and wherein when the processing information includes unique information for preventing the image data from being kept confidential, the addition determination section determines that the specific image need not be added, and the processing information generation section generates the processing information without addition such that the processing apparatus processes the image data without adding the specific image.

6. The image processing apparatus according to claim 1, wherein it is not set that the specific image is added at the time of processing the input image data, the addition determination section determines whether the processing information includes unique information, and wherein when the processing information includes no unique information for preventing the image data from being kept confidential, the addition determination section determines that the specific image needs to be added, and the processing section prints the image data with the specific image.

7. The information processing apparatus according to claim 5, wherein when it is not set that the specific image is added at the time of processing the input data, the addition determination section determines whether the processing information includes unique information, and wherein when the processing information includes no unique information for preventing the image data from being kept confidential, the addition determination section determines that the specific image needs to be added.

* * * * *